(12) United States Patent
Hall

(10) Patent No.: US 6,660,428 B2
(45) Date of Patent: Dec. 9, 2003

(54) METAL OXIDE ELECTROCHEMICAL CELL FILLED WITH A HIGHLY CONDUCTIVE GAS

(75) Inventor: John C. Hall, Rancho Palos Verdes, CA (US)

(73) Assignee: The Boeing Company, Seattle, WA (US)

( * ) Notice: Subject to any disclaimer, the term of this patent is extended or adjusted under 35 U.S.C. 154(b) by 256 days.

(21) Appl. No.: 09/855,236

(22) Filed: May 14, 2001

(65) Prior Publication Data

US 2002/0168567 A1 Nov. 14, 2002

(51) Int. Cl.[7] .................................................. H01M 2/02
(52) U.S. Cl. ................. 429/120; 429/231.1; 429/231.4; 29/232.2
(58) Field of Search ......................... 429/218.1, 218.2, 429/231.1, 120, 231.4; 29/623.1, 623.2

(56) References Cited

U.S. PATENT DOCUMENTS 5,419,981 A * 5/1995 Golben ........................ 429/37
5,635,138 A * 6/1997 Amatucci et al. ............ 422/104
5,749,927 A * 5/1998 Chern et al. ................. 29/623.5
6,391,069 B1 * 5/2002 Gozdz et al. ................ 29/623.3

OTHER PUBLICATIONS www.celgard.net "Celgard 2300 Micropous Membrane" (no date).*

* cited by examiner

Primary Examiner—Carol Chaney

(57) ABSTRACT

An electrochemical cell includes an active element having an anode including carbon, a cathode including a metal oxide, a separator between the anode and the cathode, and an electrolyte disposed between the anode and the cathode. The anode, cathode, and separator are preferably in planar form rolled into a spiral. There is a sealed housing having an interior in which the active element is received, and a gas filling a gas space of the sealed housing. The gas has from about 10 to about 100 percent by volume of the conductive gas hydrogen, helium, and/or neon, or mixtures thereof.

15 Claims, 3 Drawing Sheets

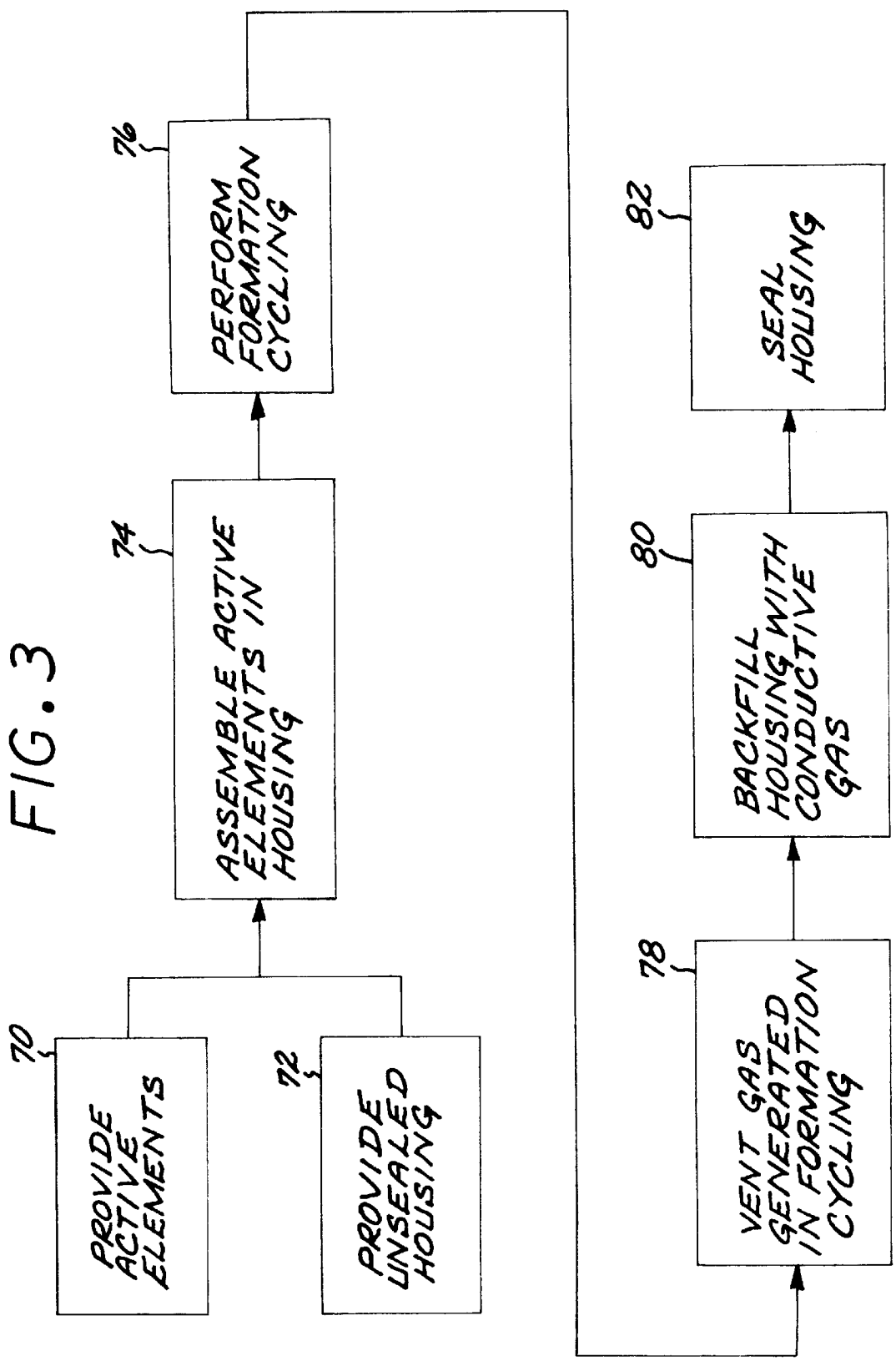

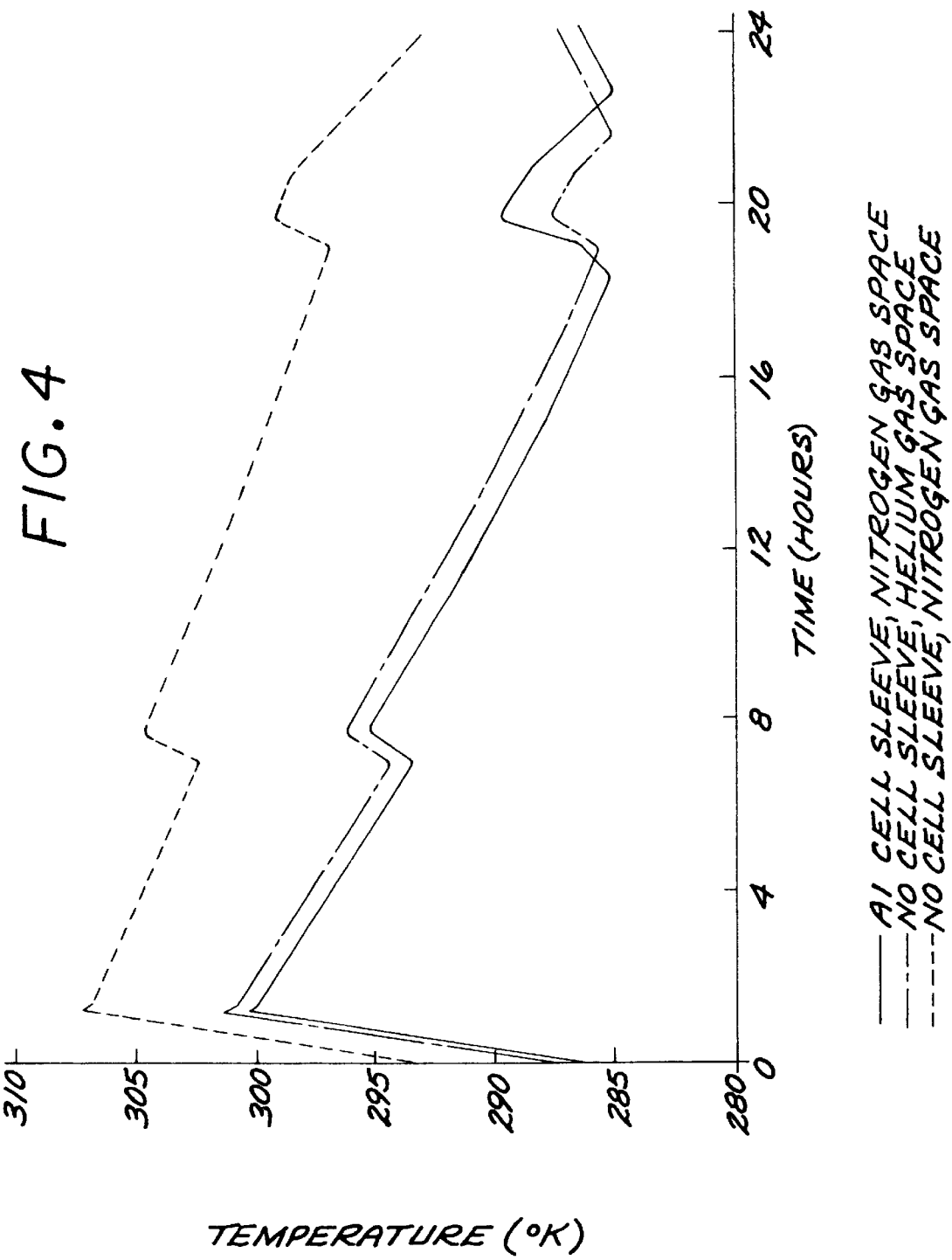

METAL OXIDE ELECTROCHEMICAL CELL FILLED WITH A HIGHLY CONDUCTIVE GAS

BACKGROUND OF THE INVENTION

This invention relates to electrochemical cells, and, more particularly, to lithium oxide/carbon cells used in spacecraft.

Metal oxide/carbon electrochemical cells, particularly lithium oxide/carbon cells, are useful for the storage of electrical charge in applications requiring a high storage capacity in a small volume. One form of such electrochemical cells typically has an active cell having an anode of carbon particles on a copper current collector, a cathode of lithium oxide-based particles on an aluminum current collector, a porous polymeric separator disposed between the anode and the cathode, and an electrolyte saturated into the separator. Multiple parallel layers of the anode, cathode, and separator may be made in a planar form that are rolled into a spiral and placed into a sealed metallic housing having feed-throughs for leads connected to the anode and cathode. A number of the individual electrochemical cells are connected together to form batteries of the required voltage and current characteristics.

An objective of electrochemical cell design for spacecraft applications is to reduce the weight and volume of the electrochemical cell as much as possible. One result is that as cell design advances, the heat produced during the charging/discharging cycle is concentrated into an ever-smaller volume. Heat removal from the electrochemical cell to a radiator is therefore a problem in these cases. The removal of heat from the anode, cathode, and separator of the active cell to the housing is one step of this heat removal process.

Many conventional heat-removal techniques from the active cell components used in other applications are not suitable for use in a weightless environment. Others are not suitable because they require major modifications to the internal structure of the electrochemical cell.

There is therefore a need for a better approach to the design of metal oxide/carbon and comparable electrochemical cells to achieve a faster heat removal from the active cells, thereby enabling the continuing reduction in size and closer packing of the electrochemical cells that form a battery. The present invention fulfills this need, and further provides related advantages.

SUMMARY OF THE INVENTION

The present invention provides an electrochemical cell with improved heat removal from the active cell components within the housing, and an approach for preparing and using the electrochemical cell. The approach does not require significant changes to the physical structure of the active elements of the electrochemical cell, yet accomplishes improved heat removal in an isotropic fashion. Substantially no weight is added to the electrochemical cell, and the weight may actually be reduced by employing the present invention. The electrochemical cell may be made more compact. The approach may be used for both spacecraft and terrestrial electrochemical cells.

In accordance with the invention, an electrochemical cell comprises an active element, comprising an anode comprising carbon, a cathode comprising a metal oxide, preferably a lithium-containing oxide, a separator between the anode and the cathode, and an electrolyte disposed between the anode and the cathode. There are typically multiple sets of these active elements arrayed together. The electrochemical cell further includes a sealed housing having an interior in which the active element is received, and a gas filling a gas space of the sealed housing. The gas space is a remainder of the interior of the sealed housing that is not filled by the active element. The gas comprises from about 10 to about 100, preferably more than about 25, percent by volume of a conductive gas selected from the group consisting of hydrogen, helium, and neon, and mixtures thereof. Hydrogen and/or helium are preferred.

In one embodiment, the anode comprises a copper anode current collector, and carbon particles supported on the anode current collector. The cathode comprises an aluminum current collector, and metal oxide particles supported on the anode current collector. The separator comprises a layer of microporous polypropylene. The electrolyte solution typically comprises a mixture of organic carbonates and $LiPF_6$. The sealed housing comprises a metallic material. Leads to the anode and cathode extend through the housing walls.

The active elements may be arranged in any operable form. In a preferred form of most interest to the inventor, the anode, the cathode, and the separator are planar and are rolled into a spiral.

The use of a highly thermally conductive gas within the gas space of the sealed housing allows heat to be conducted rapidly from the active elements to the wall of the sealed housing, which thereby acts as an intermediate thermal sink for conduction to an external radiator. The conduction occurs directly from the heat-generating source to the wall in a non-mechanical fashion, rather than through an indirect path. The thermal conduction through the gaseous phase is isotropic, and achieves thermal contact to the entire surface of both the active elements and to the wall of the housing. In the spiral cell design, heat is conducted from the edges of the anode, cathode, and separator, rather than perpendicular to the flat surfaces of these elements. Mechanical weight-adding elements such as cell sleeves and thermal fins are not required by the present approach (although they may be used if desired), nor are the complex mechanical attachments associated with these mechanical heat transfer elements. The effectiveness of the gaseous conductive medium is not altered by its orientation and by the presence or absence of gravity, as would be the case for a liquid medium. The gaseous conductive medium does not change substantially over extended periods of time, as might be the case for a liquid medium. Liquid thermal conductors may puddle and form undesirable thermal blockages, which cannot happen with the gaseous conductive medium.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is a block flow diagram of an approach for preparing the electrochemical cell; and FIG. 4 is a graph of temperature as a function of time for a computer thermal simulation of the temperature of an electrochemical cell.

DETAILED DESCRIPTION OF THE INVENTION

Figure 1:
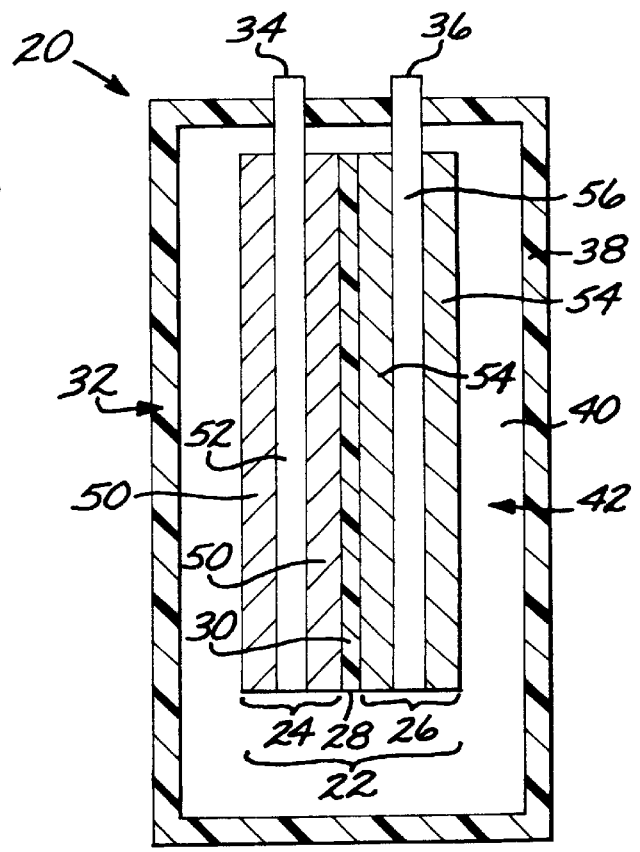
FIG. 1 is a schematic sectional view of a metal oxide/carbon electrochemical cell.

FIG. 1 schematically illustrates an electrochemical cell 20. The electrochemical cell comprises an active element 22. A single active element 22 is shown in the drawing, but there are typically multiple active elements in each electrochemical cell 20. The active element 22 includes an anode 24, a cathode 26, and a separator 28, made of a porous, electrically nonconductive material, disposed between the anode 24 and the cathode 26. An electrolyte 30 enabling ion transport is disposed between the anode 24 and the cathode 26. The electrolyte 30 is typically impregnated into the porous separator material. The active element 22 is enclosed within a sealed housing 32. The housing 32 is hermetically sealed against leakage of the contents of the sealed housing 32 and against intrusion of external elements. Leads 34 and 36 for the anode 24 and for the cathode 26, respectively, extend through a wall 38 of the sealed housing 32 to provide external connection to the anode 24 and to the cathode 26. Electrical current is carried to and from the anode 24 of each electrochemical cell 20 through the lead 34. Electrical current is carried to and from the cathode 26 of each electrochemical cell 20 through the lead 36.

The anode 24 is typically formed as layers of an anode active material 50 supported on each side of an anode current collector 52. The cathode 26 is typically formed as layers of a cathode active material 54 supported on each side of a cathode current collector 56. The current collectors 52 and 56 are in electrical communication with the respective leads 34 and 36. In the case of the preferred lithium-ion cell, the anode active material 50 releases lithium ions upon discharging of the electrochemical cell and accepts lithium ions upon charging of the electrochemical cell. The cathode active material 54 accepts lithium ions upon discharging of the electrochemical cell and releases lithium ions upon charging of the electrochemical cell.

Figure 2:
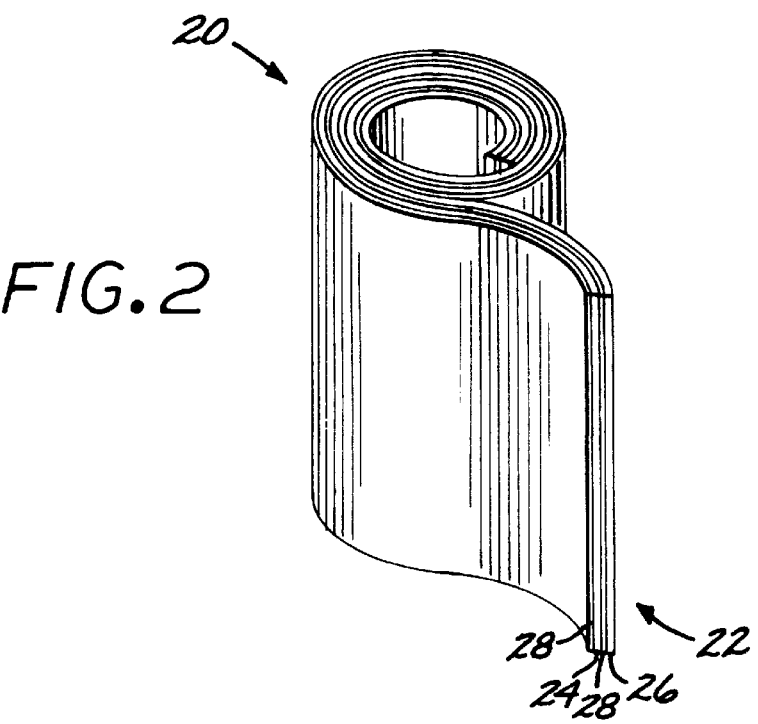
FIG. 2 is a perspective view of a spiral-wound metal oxide/carbon electrochemical cell.

The anode current collector 52 and its anode active material 50, the cathode current collector 56 and its cathode active material 54, the separator 28, and the electrolyte 30 may be made of any operable materials and have any operable physical arrangement and form. A number of operable materials and physical arrangements are known in the art. FIG. 2 illustrates a cylindrical embodiment of particular interest to the inventor. The active elements 22 are each individually planar and flexible. They are assembled together as described above and wound into a spiral within the sealed housing 32. The above description related to FIG. 1 is incorporated by reference as to the structure of these active elements 22.

In the case of the preferred spiral active elements 22, the presently most preferred dimensions and materials of construction of these elements are an anode 24 from about 0.005 to about 0.025 inch thick and made of a copper anode current collector 52 with a thin film on each side thereof of carbon-containing anode active material 50 made of carbon particles in a polymer binder that is porous to the electrolyte, such as polyvinylidene fluoride; a cathode 26 from about 0.005 to about 0.050 inch thick and made of an aluminum cathode current collector 56 with a thin film on each side thereof of a metal oxide-containing cathode active material 54, preferably a mixture of $LiCoO_2$ particles and conductive carbon particles, in a polymer binder that is porous to the electrolyte, preferably polyvinylidene fluoride; separators 28 from about 0.0005 to about 0.005 inch thick and typically made of a polymer such as polypropylene or polyethylene or a combination thereof that is electrically nonconducting but is porous to the electrolyte; and an electrolyte that is typically 1 molar $LiPF_6$ in a 2:1 mixture by volume of ethylene carbonate and dimethyl carbonate. (As used herein, reference to a metal includes the pure metal and its alloys, unless otherwise indicated. That is, "copper" includes pure copper and alloys of copper.) These dimensions and materials of construction are presented by way of illustration of the preferred embodiment and are not limiting of the invention, which is applicable to other forms of lithium-ion battery cells as well.

In each embodiment, a thermally conductive gas 40 fills a gas space 42 of the sealed housing 32. The gas space is defined as a remainder of the interior of the sealed housing 32 that is not filled by the active element 22 or an electrolyte throughout the life of the cell. The gas comprises from about 10 to about 100 percent (preferably at least about 25 percent) by volume of a conductive gas selected from the group consisting of hydrogen, helium, and neon, and mixtures thereof. Hydrogen and helium, and mixtures thereof, are preferred. Hydrogen has a thermal conductivity of about 0.163 watts per meter-K; helium has a thermal conductivity of about 0.136 watts per meter-K; and neon has a thermal conductivity of about 0.044 watts per meter-K. By comparison, nitrogen gas, which is not within the scope of the invention, has a thermal conductivity of about 0.022 watts per meter-K. The thermal conductivities of helium and hydrogen are comparable with those of condensed-phase materials such as methanol, polypropylene, and epoxy.

FIG. 3 is a block flow diagram illustrating the fabrication of an electrochemical cell 20 according to the invention. The active elements 22 (elements 24, 26, 28, and 30) are provided, numeral 70. The housing 32 is provided in an unsealed form, numeral 72. The active elements 22 are assembled into the housing 32, numeral 74. The active elements 76 are then put through cycles of charging and discharging prior to sealing the housing, a process known as formation cycling, numeral 76. The formation cycling passivates the carbon anode surface by the reaction of lithium with the electrolyte solvent to form a solid-electrolyte interface. During formation cycling, gases are generated in the gas space 42. These gases are vented, numeral 78, and the gas space 42 may be partially evacuated. The gas space 42 is thereafter backfilled, numeral 80, with the conductive gas discussed earlier, specifically at least a partial pressure of hydrogen, helium, and/or neon, or mixtures thereof. The backfill pressure may vary over a wide range, at least from about $10^{-4}$ Torr to hundreds of atmospheres, because the thermal conductivity of the conductive gas is largely independent of pressure in typical pressure ranges. After backfilling of the gas space 42, the housing 32 is sealed, numeral 82. The electrochemical cell 20 is thereafter ready for spacecraft or terrestrial use, and is used in the same manner as conventional electrochemical cells.

A temperature analysis was performed by computer heat generation and flow analysis for a 50 ampere-hour lithium-ion electrochemical cell operating in a charge/discharge cycle typical for a geosynchronous satellite. FIG. 4 illustrates the temperature of the electrochemical cell as a function of time, for the case of 1 atmosphere helium (within the scope of the invention) filling the gas space and 1 atmosphere nitrogen (not within the scope of the invention) filling the gas space. The present approach achieves a temperature reduction of from about 6° C. to 12° C., which is significant in the context of the application, for the relevant comparison of no cell sleeve. As shown, a cell sleeve may be used to increase heat flow and heat removal, but the cell sleeve adds weight and volume to the electrochemical cell 20.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An electrochemical cell comprising:
    an active element, comprising
        an anode comprising carbon,
        a cathode comprising a metal oxide,
        a separator between the anode and the cathode, and
        an electrolyte disposed between the anode and the cathode;
    a sealed housing having an interior in which the active element is received; and
    a gas filling a gas space of the sealed housing, which is a remainder of the interior of the sealed housing that is not filled by the active element, the gas comprising from about 10 to about 100 percent by volume of a conductive gas selected from the group consisting of hydrogen and neon, and mixtures thereof.

2. The electrochemical cell of claim 1, wherein the anode comprises
    a copper anode current collector, and
    carbon particles supported on the anode current collector.

3. The electrochemical cell of claim 1, wherein the cathode comprises
    an aluminum cathode current collector, and
    metal oxide particles supported on the cathode current collector.

4. The electrochemical cell of claim 1, wherein the separator comprises
    a layer of microporous polypropylene.

5. The electrochemical cell of claim 1, wherein the electrolyte comprises a mixture of organic carbonates and $LiPF_6$.

6. The electrochemical cell of claim 1, wherein the anode, the cathode, and the separator are planar and are rolled into a spiral.

7. The electrochemical cell of claim 1, wherein the metal oxide comprises lithium ions.

8. The electrochemical cell of claim 1, wherein the conductive gas is hydrogen.

9. The electrochemical cell of claim 1, wherein the conductive gas comprises at least about 25 percent by volume of the gas.

10. An electrochemical cell comprising:
    an active element, comprising
        a planar anode comprising carbon particles supported on a metallic anode current collector,
        a planar cathode comprising metal oxide particles supported on a metallic cathode current collector,
        a planar separator between the anode and the cathode, wherein the anode, the cathode, and the separator are wound into a spiral, and
        an electrolyte disposed between the anode and the cathode;
    a sealed metallic housing having an interior in which the active element is received; and
    a gas filling a gas space of the sealed housing, which is a remainder of the interior of the sealed housing that is not filled by the active element, the gas comprising from about 10 to about 100 percent by volume of a conductive gas selected from the group consisting of hydrogen and neon, and mixtures thereof.

11. The electrochemical cell of claim 10, wherein the metal oxide comprises lithium ions.

12. The electrochemical cell of claim 10, wherein the conductive gas is hydrogen.

13. The electrochemical cell of claim 10, wherein the conductive gas comprises at least about 25 percent by volume of the gas.

14. The electrochemical cell of claim 1, wherein the conductive gas further comprises helium.

15. The electrochemical cell of claim 10, wherein the conductive gas further comprises helium.

* * * * *